United States Patent
Mathews et al.

(10) Patent No.: US 7,353,803 B2
(45) Date of Patent: Apr. 8, 2008

(54) MISFIRE DETECTION APPARATUS FOR INTERNAL COMBUSTION ENGINE BASED ON PISTON SPEED

(75) Inventors: David S. Mathews, Howell, MI (US); Tameem K. Assaf, Milford, MI (US); David L. St. Pierre, Mason, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 39 days.

(21) Appl. No.: 11/390,974

(22) Filed: Mar. 28, 2006

(65) Prior Publication Data

US 2007/0137289 A1   Jun. 21, 2007

Related U.S. Application Data

(60) Provisional application No. 60/752,156, filed on Dec. 20, 2005.

(51) Int. Cl.
*F02P 5/00* (2006.01)
*F02M 7/00* (2006.01)

(52) U.S. Cl. ............... 123/406.18; 123/436; 73/35.08; 701/110

(58) Field of Classification Search .......... 123/406.14, 123/406.18, 406.23, 406.27, 406.58, 406.61, 123/406.62, 406.63; 701/101, 105, 110, 701/114; 73/35.08, 117.3
See application file for complete search history.

(56) References Cited

U.S. PATENT DOCUMENTS

| 5,237,504 | A | * | 8/1993 | Holmes et al. ............. 701/111 |
| 5,675,094 | A | | 10/1997 | Klauber et al. |
| 5,869,752 | A | | 2/1999 | Klauber et al. |
| 6,222,445 | B1 | | 4/2001 | Beckhusen |
| 6,520,159 | B2 | | 2/2003 | White et al. |
| 7,133,766 | B2 | * | 11/2006 | Kokubo ..................... 701/114 |
| 2003/0127073 | A1 | | 7/2003 | Buck et al. |
| 2003/0200789 | A1 | | 10/2003 | Tanaya |

\* cited by examiner

*Primary Examiner*—John T. Kwon (57) ABSTRACT

The present invention generally includes a method of detecting a misfire in an internal combustion engine. The method includes detecting a first engine speed at a first crankshaft position that corresponds to about a top dead center compression position of a first piston within a first cylinder and detecting a second engine speed at a second crankshaft position that corresponds to about a position subsequent to the top dead center compression position. The method determines whether the misfire occurred in the first cylinder based on the first engine speed and the second engine speed. The method provides an improved signal to noise ratio for engine misfire detection.

26 Claims, 6 Drawing Sheets

MISFIRE DETECTION APPARATUS FOR INTERNAL COMBUSTION ENGINE BASED ON PISTON SPEED

CROSS-REFERENCE TO RELATED APPLICATIONS

This application claims the benefit of U.S. Provisional Application No. 60/752,156, filed on Dec. 20, 2005. The disclosure of the above application is incorporated herein by reference.

FIELD OF THE INVENTION

The present invention relates to engine control and more specifically relates to misfire detection using an engine speed of a piston near the top dead center position.

BACKGROUND OF THE INVENTION

Vehicle manufactures produce a range of vehicle power plants including internal combustion engines. An internal combustion engine compresses and ignites a fuel and air mixture to produce engine power. If the mixture fails to ignite and/or completely burn, the incomplete combustion may be considered an engine misfire. Engine misfires can cause engine component damage or can produce unwanted emissions.

Engine speed information from a crankshaft position sensor can be used to detect engine misfires. Speed variation of a crankshaft is measured throughout the travel of a piston in a specific cylinder during a combustion event. Multiple combustion events for each cylinder are then compared to determine if a misfire has occurred. Inaccuracies, however, can occur when trying to detect engine misfires. The inaccuracies can be due to torque resonance of the crankshaft, drive line induced speed fluctuations and increased engine speed variability around an idle engine speed. Moreover, engine speed data is typically collected for each cylinder throughout the complete travel of its respective piston. The inaccuracies and voluminous data may decrease a misfire signal to noise ratio in an engine control. Undetected misfires can lead to possible engine damage and/or unwanted emissions. Falsely detected misfires can lead to unnecessary warranty costs.

SUMMARY OF THE INVENTION

The present invention generally includes a method of detecting a misfire in an internal combustion engine. The method includes detecting a first engine speed at a first crankshaft position that corresponds to about a top dead center compression position of a first piston within a first cylinder and detecting a second engine speed at a second crankshaft position that corresponds to about a position subsequent to the top dead center compression position. The method determines whether the misfire occurred in the first cylinder based on the first engine speed and the second engine speed. The method provides an improved signal to noise ratio for engine misfire detection.

Further areas of applicability of the present invention will become apparent from the detailed description and appended claims provided hereinafter. It should be understood that the detailed description and specific examples, while indicating the various embodiments of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

DETAILED DESCRIPTION OF THE PRESENT INVENTION

The following description of the various embodiments is merely exemplary in nature and is in no way intended to limit the invention, its application or uses. As used herein, the term module, control module and/or device refers to an application specific integrated circuit (ASIC), an electronic circuit, a processor (shared, dedicated, or group) and memory that executes one or more software or firmware programs, a combinational logic circuit, and/or other suitable components that provide the described functionality. Moreover, vehicle modules may communicate with various vehicle systems using digital and/or analog inputs and outputs and/or an automotive communications network including, but not limited to, the following commonly used vehicle communications network standards: CAN, SAE J1850, and GMLAN.

Figure 1:
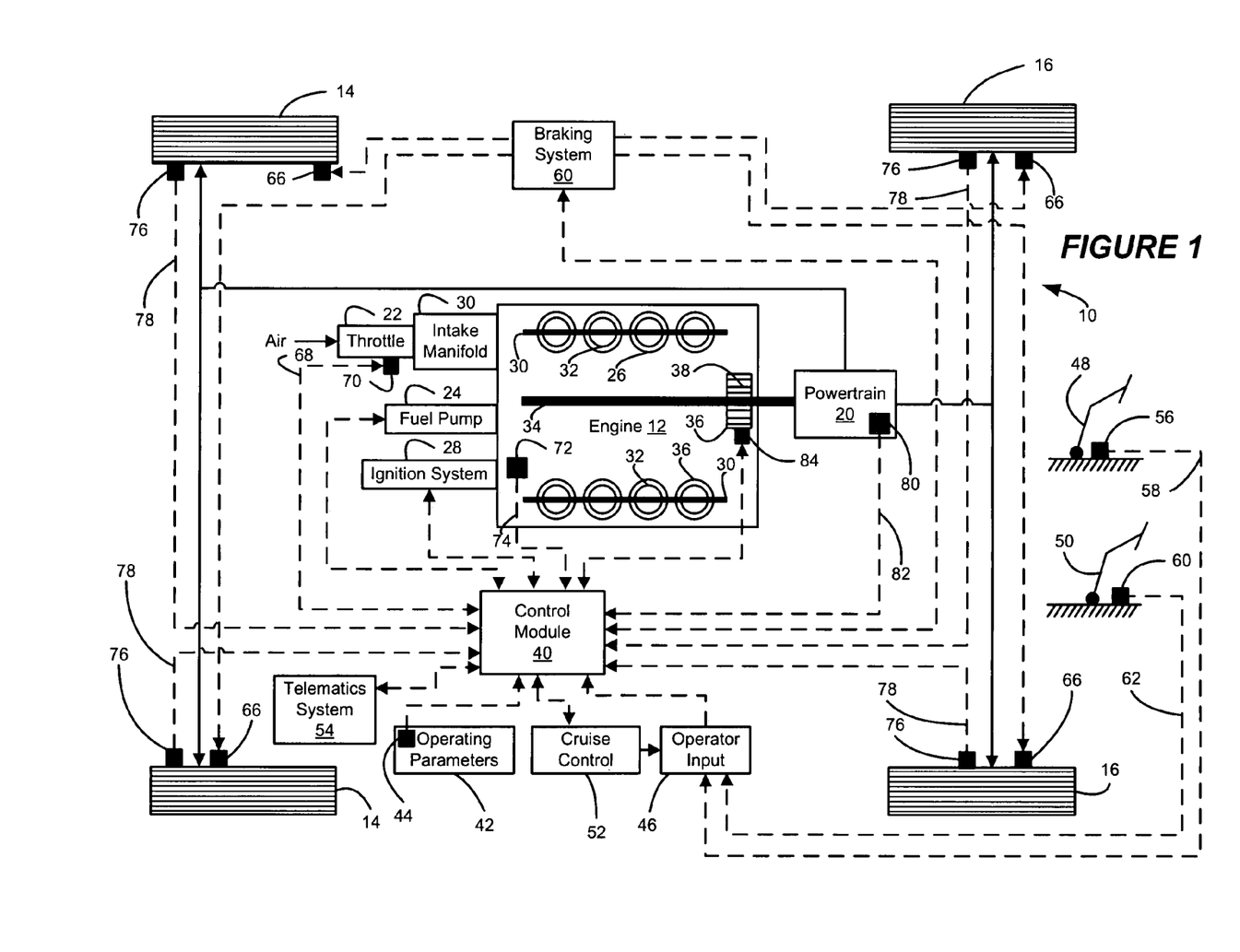
FIG. 1 is a schematic diagram illustrating a vehicle including a control module constructed in accordance with the teachings of the present invention.

Referring now to FIG. 1, a vehicle 10 includes an engine 12, driven wheels 14 and optionally-driven wheels 16. The engine 12 may produce a torque output to drive the driven wheels 14 and to drive the optionally-driven wheels 16 via a power train 18. The engine 12 includes an intake manifold 20 and a throttle 22, which regulates airflow into the intake manifold 20. The airflow from the intake manifold 22 and fuel from a fuel system 24 is ignited in a plurality of cylinders 26 by an ignition system 28. A valve train 30 regulates combustion in the cylinders 26. Combustion in each of the cylinders 26 causes a piston 32 to reciprocate, which rotatably drives a crankshaft 34. In one example, the engine 12 lacks a throttle 22, such as diesel engine and other throttle-less engines.

In one example, a timing wheel 36 couples to the crankshaft 34. The timing wheel 36 may contain a plurality of timing teeth 38 that each correspond to respective crankshaft positions (i.e. respective circumferential spacing). In one example, the timing wheel 36 contains sixty timing teeth 38. By way of the above example, each of the timing teeth 38 corresponds with (i.e., accounts for) approximately six degrees of crankshaft angle. In another example, the amount of timing teeth 38 on the timing wheel 36 may vary, which necessarily produces a different corresponding amount of crankshaft angles. In further example, an amount of the teeth 38 may be omitted from the timing wheel 36 (e.g. a gap in the teeth 38) in order to provide a reference point on the timing wheel 38.

A control module 40 may detect misfires (i.e., an incomplete combustion event) in one or more of the cylinders 26 and control various operations of the vehicle 10 and the engine 12. To detect misfires in the cylinders 26, among other things, the control module 40 may detect and/or reference operating parameters 42. One or more operating parameters 42 may be detected via one or more sensors 44. The operating parameters 42 may include, for example, but are not limited to humidity, temperature, and/or air pressure. The operating parameters 42 may also be information resident in (or on) the control module and/or other engine modules and may include, for example, but are not limited to look-up tables, reference values, engine profiles, module faults, libraries, configurations, and system flags. The control module 40 receives operator input 46 from one or more modules, which may include, for example, an accelerator pedal 48, a brake pedal 50 and/or a cruise control system 52. The control module may also communicate through a telematics system 54, such as OnStar®.

By way of the above examples, the accelerator pedal 48 is movable between a plurality of positions that are each detected by an accelerator pedal sensor 56. The accelerator pedal sensor 56 communicates an accelerator pedal signal 58 to the control module 40. Generally, the accelerator pedal 48 is positioned to regulate the torque output from the engine 12. Similarly, the brake pedal 50 is movable between a plurality of positions that are each detected by a brake pedal sensor 60. The brake pedal sensor 60 communicates a brake pedal signal 62 to the control module 40. Generally, the brake pedal 50 is positioned to regulate a braking system 64. The braking system 64 may reduce the speed of the vehicle 10, by engaging, for example, a plurality of braking components 66 attached to the wheels 14, 16. The cruise control system 52 optionally controls the speed of the vehicle 10.

The control module 40 communicates a throttle control signal 68 to a throttle actuator 70 to regulate the position of the throttle 22. An engine speed sensor 72 communicates an engine signal 74 to the control module 40. Each wheel speed sensor 76 communicates a wheel signal 78 and a power train speed sensor 80 communicates a power train signal 82 to the control module 40. In one example, the engine signal 74 includes an engine speed indicated in revolutions per minute, wherein one revolution corresponds with the crankshaft 34 rotating 360 degrees. By way of the above example, a complete engine cycle may be defined as two crankshaft revolutions, wherein the two crankshaft revolutions correspond to all of the cylinders 26 firing (i.e., a combustion event occurs) and the crankshaft rotating 720 degrees.

A crankshaft sensor 84 detects a crankshaft position and communicates a crankshaft signal 86 to the control module 40. In one example, the crankshaft signal 86 includes a crankshaft angle. By way of the above example, the control module 40 may determine the speed of the engine 12 based on the crankshaft position signal 86. For example, the crankshaft has a first position (i.e., $C_{a1}$) and a second position (i.e., $C_{a2}$) and an angular distance (i.e., D) therebetween (i.e., $C_{a2}-C_{a1}=D$). The angular distance (D) may be, for example one degree of circumferential spacing about the crankshaft 34. The control module 40 determines a time elapsed (i.e. T) as the crankshaft 34 rotates from the first position ($C_{A1}$) to the second position ($C_{A2}$). From the above information, the control module 40 determines the rotational or angular velocity (V) of the crankshaft 34 (i.e., V such that V=D/T), which indicates the engine speed. The control module 34 may associate the engine speed (V) with the second position ($C_{a2}$). With the above in mind, the control module 40 may associate a plurality of engine speeds with the respective crankshaft positions.

In one example, the control module 40 associates the plurality of engine speeds with the respective timing teeth 38. For example, the crankshaft has a first timing tooth (i.e., $Th_1$) and a second timing tooth (i.e., $Th_2$) and a distance (i.e., D) therebetween (i.e., $Th_2-Th_1=D$). The distance (D) may be, for example six degrees. The control module 40 determines a time elapsed (i.e. T) as the crankshaft 34 rotates from the first timing tooth ($Th_1$) to the second timing tooth ($Th_2$). From the above information, the control module 40 determines the rotational or angular velocity (V) of the crankshaft 34 (i.e., V such that V=D/T), which indicates the engine speed. The control module 34 may associate the engine speed (V) with the second timing tooth ($Th_2$). It is appreciated that D may have a range of values such that the velocity may be determined over angles, minutes and/or seconds.

In one example, control module determines engine speeds over the complete engine cycle (i.e., 720 degrees of engine rotation). By way of the above example, each timing tooth 38 may be counted twice because the crankshaft sensor 84 defects each timing tooth 38 twice in one engine cycle. In one example, the timing wheel 36 may have 60 timing teeth 38. By way of the above example, the engine speed is associated with each of the respective timing teeth 38 such that there are 120 engine speeds determined, one engine speed per tooth 38 per crankshaft rotation.

The crankshaft sensor 84 may magnetically detect each of the teeth 38 of the timing wheel 36 by detecting each trailing edge (not specifically shown) of the respective teeth 38. In another example, the crankshaft sensor 84 may optically detect a reference mark on the crankshaft 34. Other portions of the crankshaft 34 and/or teeth 38 may serve as a reference for the crankshaft position sensor 76. In one another example, detection of engine speed may be based on detecting position and/or speed of a shaft or suitable portion of one or more engine components, which may include, for example, but are not limited to camshafts, accessory shafts, balance shafts and/or governor shafts.

The engine 12 operates at an idle speed, a maximum speed and a range speeds therebetween. In one example, the control module 40 may vary the idle engine speed based on a load on the engine 12. To regulate the speed of the engine (i.e. control combustion), the control module 40 communicates with the ignition system 28, the fuel system 24 and/or the throttle 24 to alter one or more combustion characteristics. The control module 40 may detect engine misfires based one or more of the above disclosed components, sensors, and/or signals. It is appreciated that conditions in the engine 12 may produce combustion characteristics that may mimic one or more of the characteristics of the misfire (e.g., momentary loss of engine speed), but may otherwise may not be due to an actual misfire. The control module 40, therefore, may also determine and/or parse a plurality of combustion characteristic based on the one or more above disclosed components. When the control module 40 detects the engine misfire has actually occurred, the control module 40 may initiate remedial action. Remedial action may include, for example, but is not limited to, illuminating service lights, ceasing combustion in one or more cylinders and/or calling for assistance through the telematics system 54.

Figure 2:
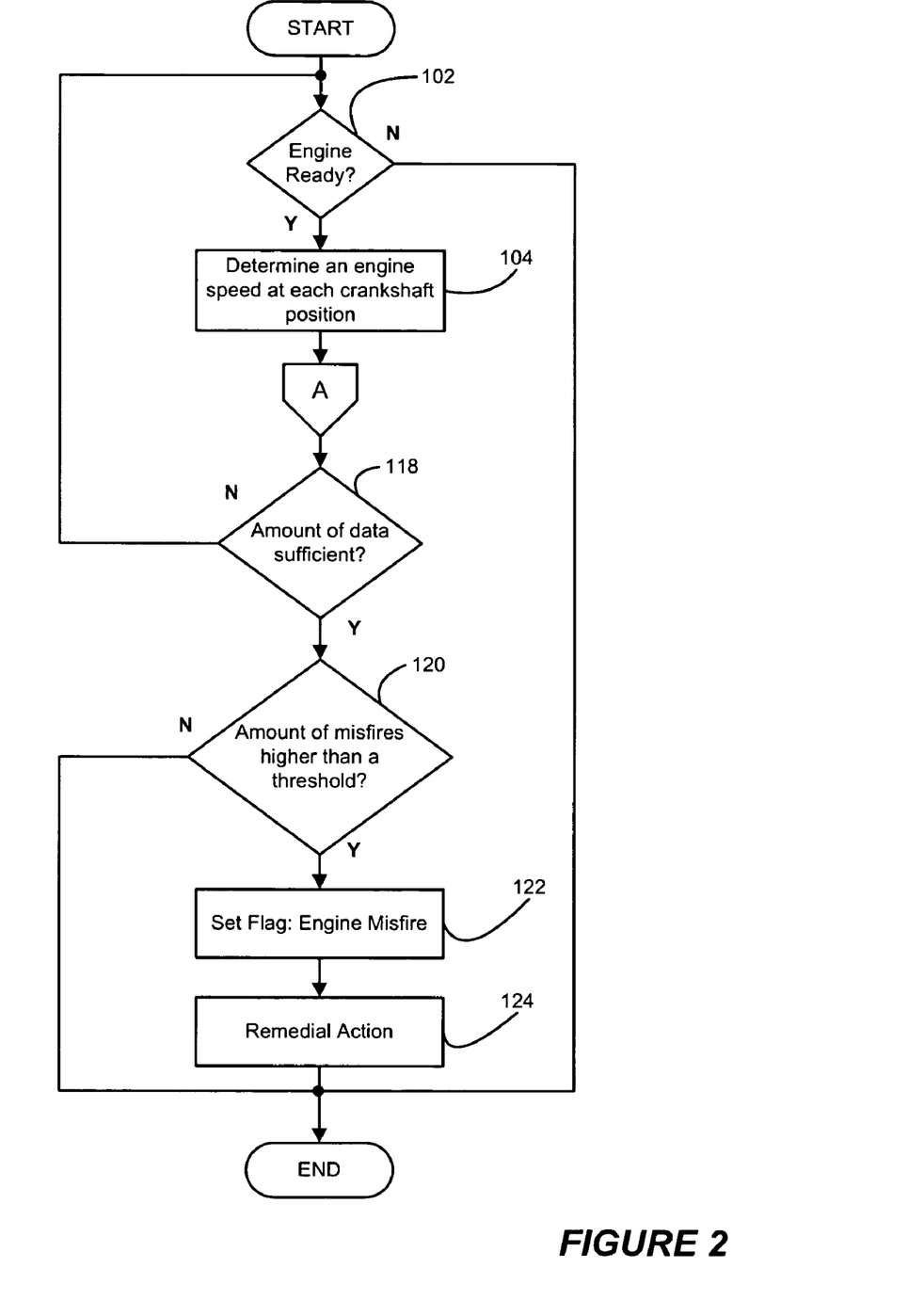
FIG. 2 is a flow chart illustrating an exemplary engine speed misfire detection system constructed in accordance with the teachings of the present invention.

In one example and with reference to FIG. 2, a misfire detection system detects misfires in one of the cylinders 26 of the engine 12. In step 102, control determines if the engine 12 is ready. The engine ready determination may be based on the operating parameters 42 and/or the operator input 46. In one example, the operating parameters 42 may indicate a system fault due to a sensor not communicating with the control module 40 and thus the engine 12 is not ready. In another example, the operator input 46 may indicate a relatively large demand for a reduction in engine torque and thus the engine 12 is not ready. When the engine 12 is not ready, control ends. When the engine 12 is ready, control, continues with step 104.

In step 104, control determines an engine speed at each crankshaft position. In one example, the plurality of engine speeds is determined for the each respective crankshaft angle. In one example, the plurality of engine speeds is determined for the each respective timing tooth 38. In various examples, control continues with step 106 in FIG. 3, step 202 in FIG. 4, step 252 in FIG. 5 or step 302 in FIG. 6 based on, for example, engine configurations.

Figure 3:
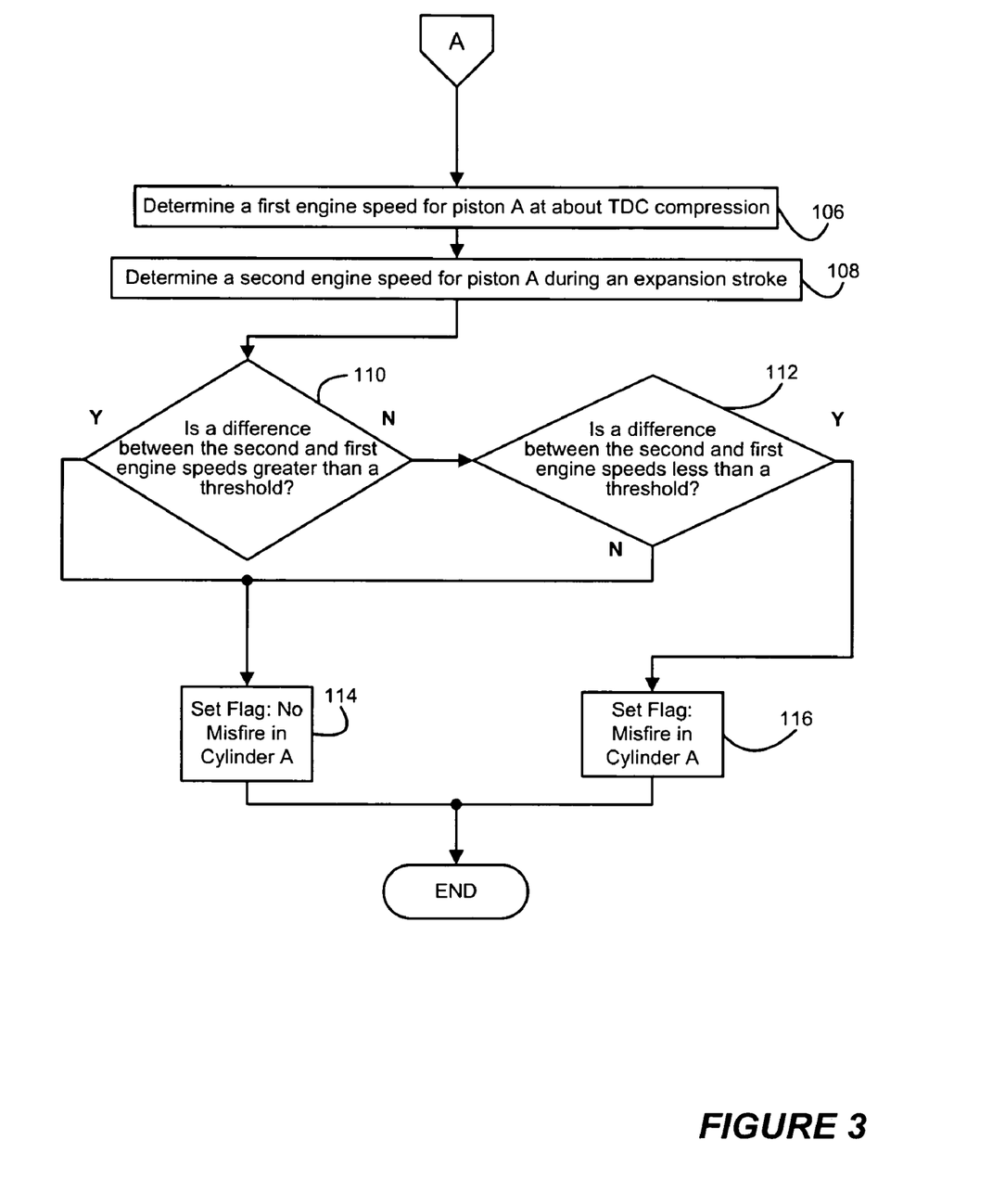
FIG. 3 is a portion of the flow chart of FIG. 2 in accordance with the teachings of the present invention.

In step 106 and with reference to FIG. 3, control determines a first engine speed (i.e. $RPM_1$) at a first crankshaft position ($C_{a1}$) and/or a first timing tooth ($Th_1$) that correlates with a top dead center compression (TDCC) position for piston A in cylinder A. It is appreciated that the TDCC position correlates to position marked by the top-most travel of a piston within a cylinder during the compression stroke and not during the exhaust stroke. It is also appreciated that Cylinder A refers to any cylinder in the internal combustion engine. As such, Cylinder B may refer to a cylinder immediately subsequent to Cylinder A in a cylinder firing order. Cylinder C, therefore, may refer to a cylinder immediately subsequent to Cylinder B in the cylinder firing order. Cylinder D, therefore, may refer to a cylinder immediately subsequent to Cylinder C in the cylinder firing order.

In step 108, control determines a second engine speed (i.e., $RPM_2$) at a second crankshaft position ($C_{a2}$) and/or a second timing tooth ($Th_2$) that correlates with a position of piston A in the expansion stroke, thus subsequent to the TDCC position. In one example, the second ($Th_2$) is spaced from the first tooth (Th1) by five teeth. By way of the above example, the timing wheel 36 has 60 equally-spaced teeth, thus each tooth accounts for about six degrees of angular rotation (i.e., circumferential spacing). As such, there is about 30 degrees of crankshaft rotation between the first tooth ($Th_1$) and the second tooth ($Th_2$).

In step 110, control determines a difference between the second engine speed ($RPM_2$) and the first engine speed ($RPM_1$) by computing a first derivative (i.e. $d[n]_{21}=r[n]-r[n-1]$, where $r[n]$ and $r[n-1]$ represent $RPM_2$ and $RPM_1$, respectively, $[n]$ represents a discrete time step and $[n-1]$ represents a previous discrete time step). When control determines that the value of the first derivative ($d[n]_{21}$) is greater than a threshold, control proceeds with step 114. When control determines that the value of the first derivative ($d[n]_{21}$) is not greater than the threshold, control proceeds to step 112.

In step 112, control determines whether the value of the first derivative ($d[n]_{21}$) is less than a threshold value (e.g., $RPM_t$ such that $RPM_2-RPM_1<RPM_t$). When control determines that the value of the first derivative ($d[n]_{21}$) is greater than or equal to the threshold value, control continues with step 114. When control determines that the value of the first derivative ($d[n]_{21}$) is less than the threshold value, control continues with step 116.

In step 116, control sets a flag that a misfire occurred in Cylinder A and control continues with step 118, as shown in FIG. 2. In step 114, control sets a flag that no misfire occurred in Cylinder A and control continues with step 118, as shown in FIG. 2. In step 118 and with reference to FIG. 2, control determines whether an amount of data is sufficient for statistical purposes to create a reliable data set of engine misfire information. In one example, each flag (whether the misfire flag in step 116 or the no misfire flag in step 114) may be defined as a single value in a larger sample of a plurality of values (misfires and/or no misfires) When the sample size exceeds a statistically suitable sample size, the amount of data is sufficient. When the amount of data is sufficient, control continues with step 120. If the amount of data is insufficient, control loops back to step 102. It is appreciated that the sufficiency of the data set may be dependent upon the engine system, data accuracy demands and/or the sophistication of the control module 40.

In step 120, control determines whether the amount of misfires detected in the sample is higher than a threshold. When the amount of misfires is higher than the threshold, control continues with step 122. When the amount of misfires is less than or about equal to the threshold amount, control ends. In step 122, control sets a flag indicating engine misfire. In step 124, control can take remedial action based on the engine misfire flag of step 122. Remedial action may include, for example, but is not limited to, illuminating service lights, ceasing combustion in one or more cylinders and/or calling for assistance through the telematics system 54.

Figure 4:
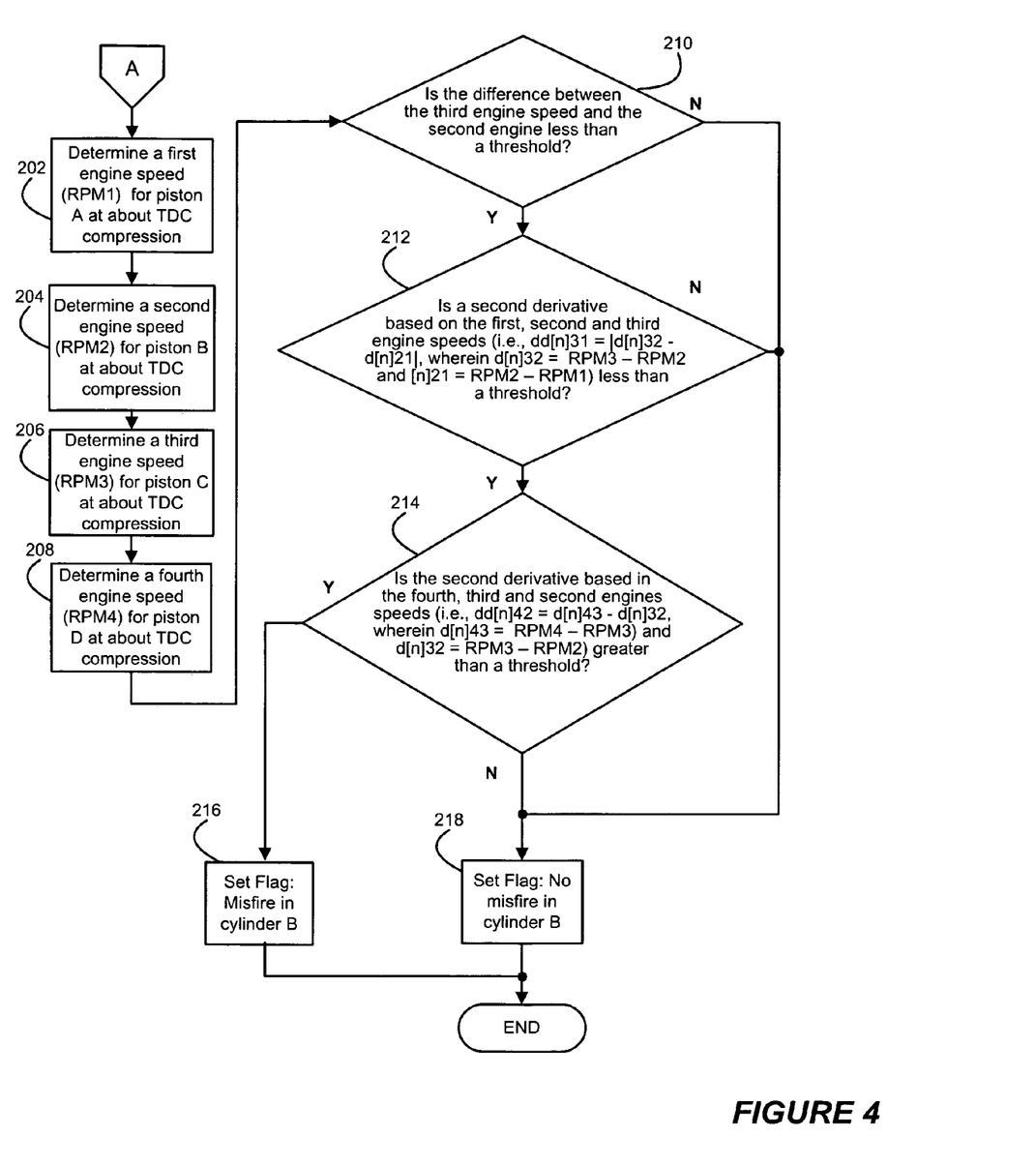
FIGS. 4-6 are portions of the flow chart of FIG. 2 in accordance with alternative examples of the teachings of the present invention.

In one example and with reference to FIG. 2 and FIG. 4, a misfire detection system detects misfires in one of the cylinders 26 of the engine 12. In step 104 and with reference to FIG. 3, control determines an engine speed at each crankshaft position and continues with step 202, as shown in FIG. 4.

In step 202 and with reference to FIG. 4, control determines a first engine speed (i.e. $RPM_1$) at a first crankshaft position ($C_{a1}$) and/or a first timing tooth ($Th_1$) that correlates with a top dead center compression (TDCC) position for a piston A in a cylinder A. In step 204, control determines a second engine speed (i.e. $RPM_2$) at a second crankshaft position ($C_{a2}$) and/or a second timing tooth ($Th_2$) that correlates with the top dead center compression (TDCC) position for a piston B in a cylinder B. In step 206, control determines a third engine speed (i.e. $RPM_3$) at a third crankshaft position ($C_{a3}$) and/or a third timing tooth ($Th_3$) that correlates with the top dead center compression (TDCC) position for piston C in cylinder C. In step 208, control determines a fourth engine speed (i.e. $RPM_4$) at a fourth crankshaft position ($C_{a4}$) and/or a fourth timing tooth ($Th_4$) that correlates with the top dead center compression (TDCC) position for a piston D in a cylinder D.

In step 210, control determines a change between the third engine speed ($RPM_3$) and the second engine speed ($RPM_2$), by computing a first derivative (i.e., $d[n]_{32}=r[n]-r[n-1]$, where $r[n]$ and $r[n-1]$ represent $RPM_3$ and $RPM_2$, respectively, $[n]$ represents a discrete time step and $[n-1]$ represents a previous discrete time step). When the value of the first derivative ($d[n]_{32}$) is less than a threshold, control proceeds to with step 212. When control determines that the value of the first derivative $d[n]_{32}$ is greater or equal to a threshold, control proceeds with step 218.

In step 212, control determines a change between the third engine speed ($RPM_3$) and the second engine speed ($RPM_2$) by computing a first derivative, i.e., $d[n]_{32}=RPM_3-RPM_2$. Control then determines a change between the second engine speed ($RPM_2$) and the first engine speed ($RPM_1$) by computing a another first derivative, i.e., $d[n]_{21}=RPM_2-RPM_1$. In one example, control then determines a change between the first derivatives by computing a second derivative, i.e., $dd[n]_{31}=d[n]_{32}-d[n]_{21}$. When the value of the second derivative ($dd[n]_{31}$) is less than a threshold, control continues with step 214. When control determines that value of the second derivate ($dd[n]_{31}$) is greater than or equal to a threshold, control continues with step 218. It can be appreciated that aforementioned first and second derivatives are correlated together in a state space that characterizes engine behavior in which the first derivative, the second derivative and cylinder after misfire thresholds are produced.

In step 214, control determines a change between the fourth engine speed ($RPM_4$) and the third engine speed ($RPM_3$) by computing a first derivative, i.e., $d[n]_{43}=RPM_4-RPM_3$. Control then determines a change between the third engine speed ($RPM_3$) and the second engine speed ($RPM_2$) by computing another first derivative, i.e., $d[n]_{32}=RPM_3-RPM_2$. Control than determines a rate of change between the fourth engine speed ($RPM_4$) and the third engine speed ($RPM_3$) by computing a second derivative, i.e., $dd[n]_{42}=d[n]_{43}-d[n]_{32}$. When control determines that the value of the second derivative ($dd[n]_{42}$) is greater than a threshold, control continues with step 218. It will be shown that when the second derivate ($dd[n]_{42}$) is greater than the threshold, the piston and cylinder—after misfiring—still produces energy. When control determines that the second derivative ($dd[n]_{42}$) is less than or equal to a threshold, control continues with step 216.

In step 216, control sets a flag that a misfire occurred in Cylinder B and control continues with step 118, as shown in FIG. 2. In step 218, control sets a flag that no misfire occurred in Cylinder B and control continues with step 118, as shown in FIG. 2.

Figure 5:
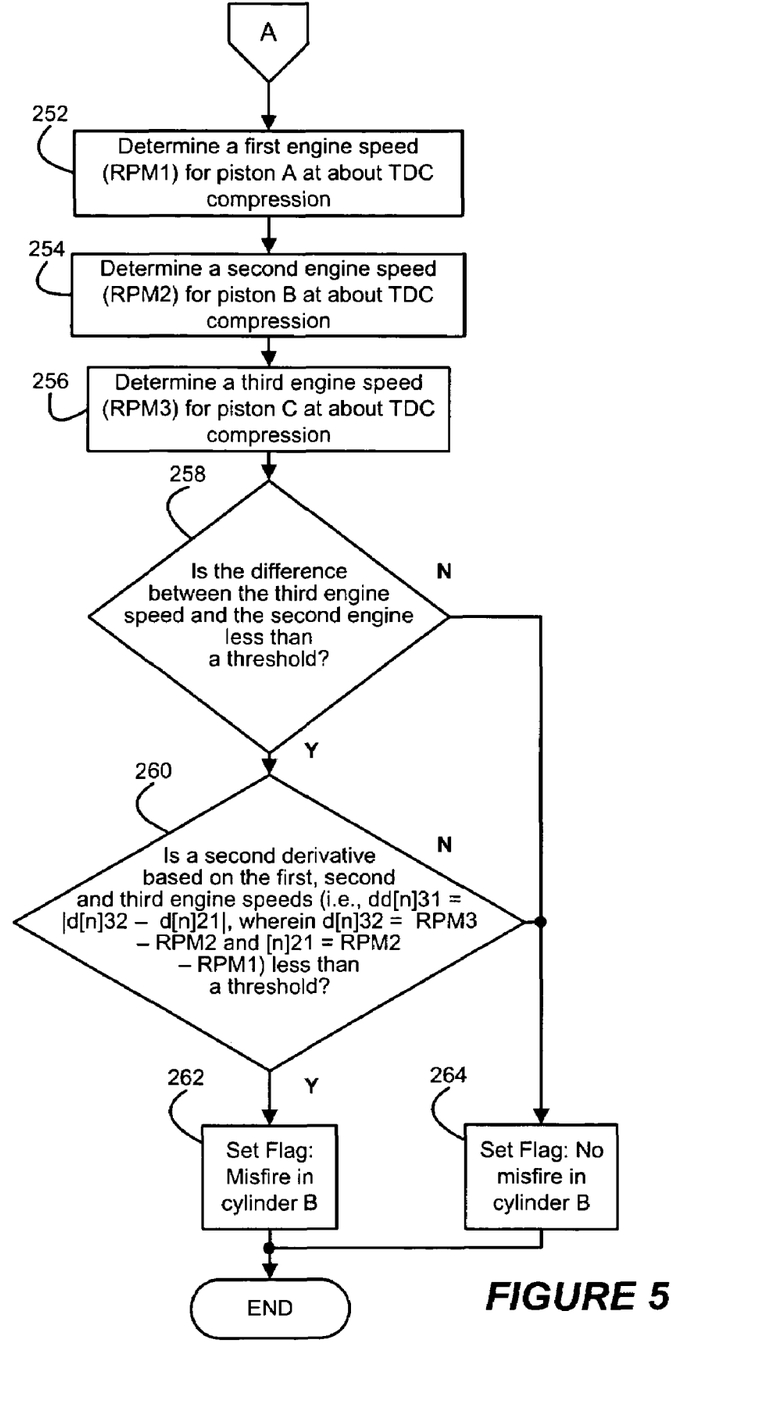

In one example and with reference to FIG. 2 and FIG. 5, a misfire detection system detects misfires in one of the cylinders 26 of the engine 12. In step 104 and with reference to FIG. 4, control determines an engine speed at each crankshaft position and continues with step 252, as shown in FIG. 5.

In step 252 and with reference to FIG. 5, control determines a first engine speed ($RPM_1$) at a first crankshaft position ($C_{a1}$) and/or a first timing tooth ($Th_1$) that correlates with the top dead center compression (TDCC) position for piston A in cylinder A. In step 254, control determines a second engine speed ($RPM_2$) at a second crankshaft position ($C_{a2}$) and/or a second timing tooth ($Th_2$) that correlates with the top dead center compression (TDCC) position for piston B in cylinder B. In step 256, control determines a third engine speed ($RPM_3$) at a third crankshaft position ($C_{a3}$) and/or a third timing tooth ($Th_3$) that correlates with a top dead center compression (TDCC) position for piston C in cylinder C.

In step 258, control determines a difference between a third engine speed ($RPM_3$) and a second engine speed ($RPM_2$) by computing a first derivate, i.e., $d[n]_{32}=RPM_2-RPM_1$. When control determines that the value of the first derivate ($d[n]_{32}$) is less than a threshold, control proceeds to step 260. When control determines that the value of the first derivative ($d[n]_{32}$) is greater than or equal to a threshold, control continues with step 264.

In step 260, control determines a change between the above first engine speed ($RPM_1$), the second engine speed ($RPM_2$) and the third engine speed ($RPM_3$) by computing a second derivative, i.e., $dd[n]_{31}=d[n]_{32}-d[n]_{21}$. When control determines that the value of second derivative ($dd[n]_{31}$) is less than a threshold, control proceeds to step 262. When control determines that the value of the second derivative ($dd[n]_{31}$) is greater than or equal to a threshold, control continues with step 264. It can be appreciated that aforementioned first and second derivatives are correlated together in a state space that characterizes engine behavior in which the first derivative and the second derivative thresholds are produced.

In step 262, control sets a flag that a misfire occurred in Cylinder B and control continues with step 118, as shown in FIG. 2. In step 264, control sets a flag that no misfire occurred in Cylinder B and control continues with step 118, as shown in FIG. 2.

Figure 6:
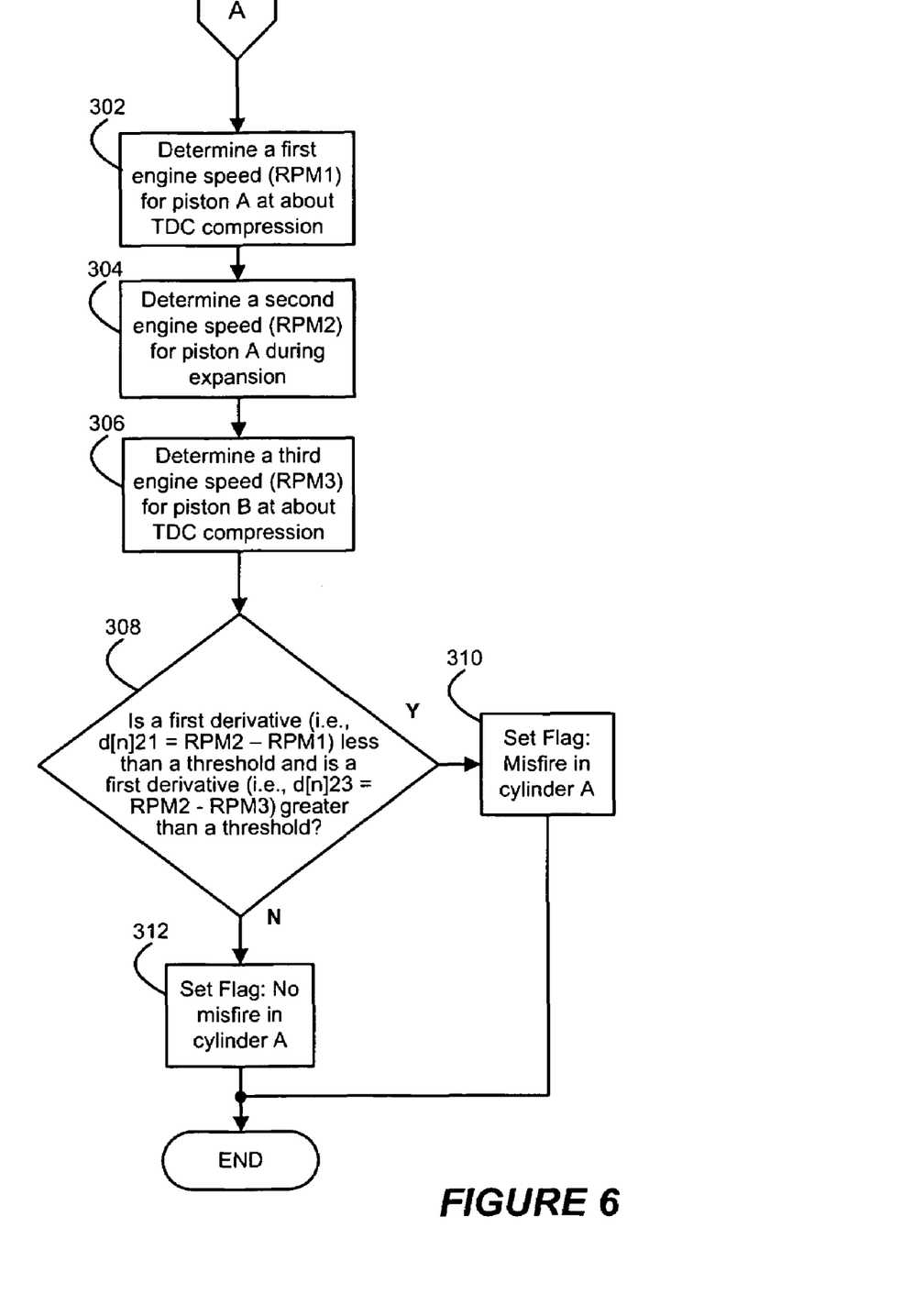

In one example and with reference to FIG. 2 and FIG. 6, a misfire detection system detects misfires in one of the cylinders 26 of the engine 12. In step 104 and with reference to FIG. 6, control determines an engine speed at each crankshaft position and continues with step 302, as shown in FIG. 6.

In step 302 and with reference to FIG. 7, control determines a first engine speed (i.e. $RPM_1$) at a first crankshaft position ($C_{a1}$) and/or a first timing tooth ($Th_1$) that correlates with the top dead center compression (TDCC) position for piston A in cylinder A. In step 304, control determines a second engine speed (i.e., $RPM_2$) at a second crankshaft position ($C_{a2}$) and/or a second timing tooth ($Th_2$) that correlates with a position of piston A in the expansion stroke, thus subsequent to the TDCC position. In step 306, control determines a third engine speed (i.e. $RPM_3$) at a third crankshaft position ($C_{a2}$) and/or a third timing tooth ($Th_2$) that correlates with a top dead center compression (TDCC) position for piston B in cylinder B.

In step 308, control a determines a difference between the second engine speed ($RPM_2$) and the first engine speed ($RPM_1$) by computing a first derivative (i.e., $d[n]_{21}=RPM_2-RPM_1$). Control also determines a difference between the third engine speed ($RPM_3$) and the second engine speed ($RPM_2$) by computing a first derivative (i.e., $d[n]_{23}=RPM_2-RPM_3$). When control determines that the first derivative ($d[n]_{21}$) is less than a threshold and the first derivative ($d[n]_{23}$) is greater than a threshold, then control proceeds to step 310, otherwise control proceeds to step 312. When control determines that the first derivative ($d[n]_{21}$) is less than a threshold and the first derivative ($d[n]_{23}$) is greater than a threshold, it may be shown that power from Cylinder A is relatively low, while drop or compression in Cylinder A is relatively high.

In step 310, control sets a flag that a misfire occurred in Cylinder A and control continues with step 118, as shown in FIG. 2. In step 312, control sets a flag that no misfire occurred in Cylinder A and control continues with step 118, as shown in FIG. 2.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of detecting a misfire in an engine comprising:
    detecting a first engine speed at a first crankshaft position that corresponds to about a top dead center compression position of a first piston within a first cylinder during a first operating cycle thereof;
    detecting a second engine speed at a second crankshaft position that corresponds to about a position subsequent to said top dead center compression position during said first operating cycle; and
    determining whether the misfire occurred in said first cylinder based on said first engine speed and said second engine speed.

2. The method of claim 1 wherein said determining whether the misfire occurred in said first cylinder based on said first engine speed and said second engine speed includes determining a first change in a first piston speed based on a difference between said first engine speed and said second engine speed and determining whether the misfire occurred in said first cylinder based on said first change and detecting the misfire in said first cylinder when a magnitude of said first change is greater than a threshold.

3. The method of claim 1 wherein thirty degrees of circumferential crankshaft spacing separate said first crankshaft position and said second crankshaft position.

4. The method of claim 3 wherein a second timing tooth corresponds to said second crankshaft position, a first timing tooth corresponds to said first crankshaft position and each of said first timing tooth and said second timing tooth corresponds to six degrees of circumferential crankshaft spacing.

5. The method of claim 4 wherein five timing teeth are disposed between said first timing tooth and second timing tooth.

6. The method of claim 4 further comprising detecting a trailing edge of each timing tooth.

7. The method of claim 1 further comprising detecting a plurality of engine speeds that correspond to respective crankshaft positions.

8. The method of claim 1 further comprising detecting a plurality of engine speeds that correspond to respective timing teeth.

9. The method of claim 1 further comprising detecting a third engine speed at a third crankshaft position that corresponds to about a top dead center compression position of a second piston within a second cylinder.

10. The method of claim 9 wherein said second cylinder is immediately subsequent said first cylinder in a cylinder firing order.

11. The method of claim 9 further comprising determining whether the misfire occurred in said second cylinder when a value of a first derivative based on said first engine speed and said second engine speed is less than a threshold and a second derivative based on said first engine speed, said second engine speed and said third engine speed is less than a threshold.

12. A method of detecting a misfire in an internal combustion engine comprising:
   detecting a first engine speed at a first crankshaft position that corresponds to about a top dead center compression position of a first piston within a first cylinder;
   detecting a second engine speed at a second crankshaft position that corresponds to about a top dead center compression position of a second piston within a second cylinder;
   detecting a third engine speed at a third crankshaft position that corresponds to about a top dead center compression position of a third piston within a third cylinder; and
   determining the misfire occurred in said second cylinder when a change between said third engine speed and said second engine speed is less than a threshold and a second derivative based on said third engine speed, said second engine speed and said first engine speed is less than a threshold.

13. The method claim of claim 12 further comprising detecting a fourth engine speed at a fourth crankshaft position that corresponds to about a top dead center compression position of a fourth piston within a fourth cylinder.

14. The method of claim 13 further comprising determining whether the misfire occurred in said second cylinder based further on said fourth engine speed.

15. The method of claim 13 wherein said determining the misfire occurs when
   a second derivative based on said fourth engine speed, said third engine speed and said second engine speed is less than a threshold.

16. A misfire detection system for an internal combustion engine comprising:
   a first cylinder having a first piston coupled to a crankshaft, said piston traveling through a plurality of positions, each of said positions corresponding to respective crankshaft positions; and
   a control module that detects a first engine speed at a first crankshaft position that corresponds to a top dead center compression position of said first piston within said first cylinder during a first operating cycle thereof, that detects a second engine speed at a second crankshaft position during said first operating cycle, that determines a first change in engine speed based on a difference between said first engine speed and said second engine speed, and that determines whether the misfire occurred in said first cylinder based on said first change in said first engine speed.

17. The system of claim 16 wherein said second crankshaft position occurs after said first crankshaft position.

18. The system of claim 16 wherein thirty degrees of circumferential crankshaft spacing separate said first crankshaft position from said second crankshaft position.

19. The system of claim 16 further comprising a second cylinder having a second piston connected to said crankshaft, said piston traveling through a plurality of positions, each of said positions corresponding to respective crankshaft positions.

20. The system of claim 19 wherein said control module detects a third engine speed at a third crankshaft position that corresponds to said top dead center compression position of said third piston within said third cylinder.

21. The system of claim 20 wherein said control module determines that a misfire occurred in said first cylinder when a change between said second engine speed and said first engine speed is greater than a threshold.

22. The system of claim 20 wherein said control module determines that a misfire occurred in said first cylinder when
   a change between said second engine speed and said first engine speed is less than a threshold, and
   a change between said third engine speed and said second engine speed is greater than a threshold.

23. A misfire detection system for an internal combustion engine comprising:
   a first cylinder having a first piston connected to a crankshaft, said first piston traveling through a plurality of positions, each of said positions corresponding to respective crankshaft positions;
   a second cylinder having a second piston connected to said crankshaft, said second piston traveling through a plurality of positions, each of said positions corresponding to respective crankshaft positions;
   a third cylinder having a third piston connected to said crankshaft, said third piston traveling through a plurality of positions, each of said positions corresponding to respective crankshaft positions; and
   a control module that detects a first engine speed at a first crankshaft position that corresponds to about a top dead center compression position of said first piston within said first cylinder, that detects a second engine speed at a second crankshaft position that corresponds to about a top dead center compression position of said second piston in said second cylinder, that detects a third engine speed at a third crankshaft position that corresponds to about a top dead center compression position of said third piston within said third cylinder and that determines whether a misfire has occurred in said second cylinder when a change between said third engine speed and said second engine speed is less than a threshold, and a value of a second derivative based on a third engine speed, a second engine speed and a first engine speed is less than a threshold.

24. The system of claim 23 wherein said second cylinder is immediately subsequent said first cylinder in a cylinder firing order.

25. The system of claim 23 further comprising a fourth cylinder having a fourth piston connected to said crankshaft, said fourth piston traveling through a plurality of positions, each of said positions corresponding to respective crankshaft positions and wherein said control module detects a fourth engine speed at a fourth crankshaft position that corresponds to about a top dead center compression position of said fourth piston within said fourth cylinder and determines whether a misfire has occurred in said second cylinder based further on said fourth engine speed.

26. The system claim of claim 25 wherein said control module determines the misfire occurred in said second cylinder when a second derivative based on said fourth engine speed, said third engine speed and said second engine speed is less than a threshold.

* * * * *